FIG. 1.
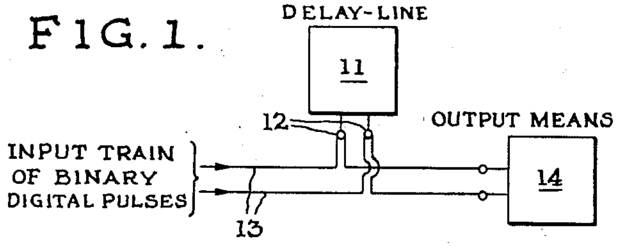
FIG. 2.
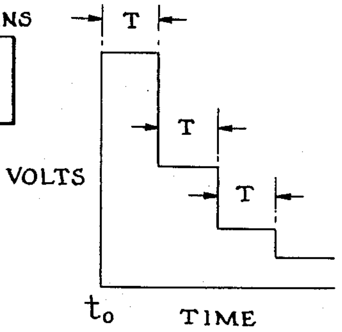
FIG. 3.
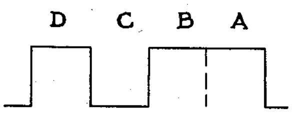
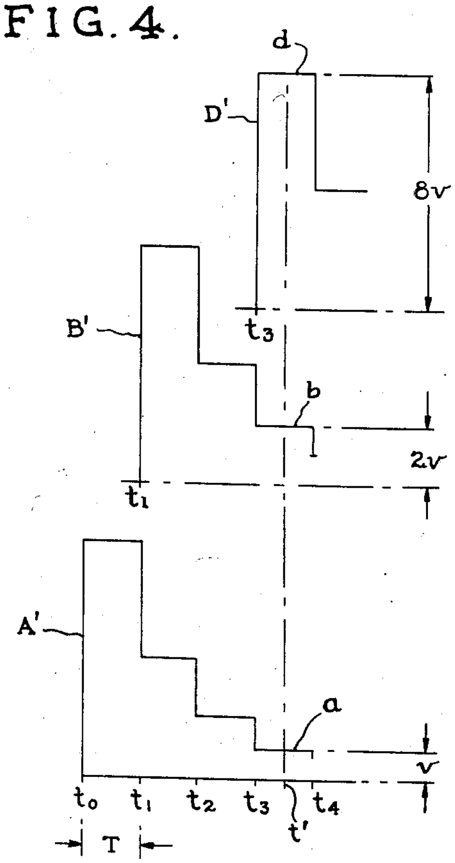
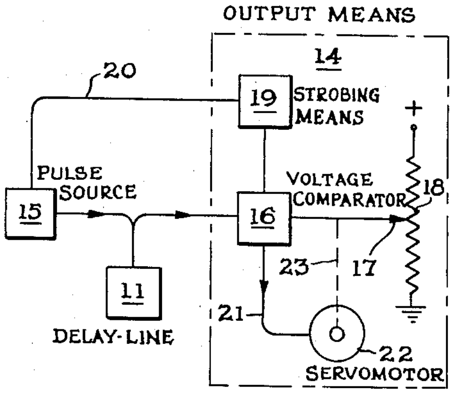
FIG. 5.
INVENTORS
GORDON GEORGE SCARROTT
KENNETH CHARLES JOHNSON
BY Cameron, Kerkam & Sutton
ATTORNEYS

INVENTORS

GORDON GEORGE SCARROTT.

KENNETH CHARLES JOHNSON.

BY

Cameron, Kerkam & Sutton

ATTORNEYS

United States Patent Office 2,870,437

Patented Jan. 20, 1959

2,870,437

DIGITAL-ANALOGUE CONVERTER

Gordon George Scarrott, Manchester, and Kenneth Charles Johnson, Gatley, Cheadle, England, assignors to Ferranti, Limited, Hollinwood, Lancashire, England, a company of Great Britain Application November 19, 1956, Serial No. 622,979

Claims priority, application Great Britain November 24, 1955

7 Claims. (Cl. 340—347)

This invention relates to digital-analogue converters of the type for deriving a signal proportional to the number represented by an input train of binary digital current pulses of uniform width and height, the pulse representing the most significant digit coming last. Such a converter will hereinafter be referred to as being of the type stated.

An object of the present invention is to provide a converter of the type stated which is of simple and inexpensive construction but of accurate performance.

In accordance with the present invention, a digital-analogue converter of the type stated includes a two-terminal delay line having a delay equal to half the pulse interval T of said pulses and a mismatch and/or loss such that there is a loss factor of two over each reflection cycle (as hereinafter defined), connections for applying said input train to said terminals, and output means for deriving the voltage across said terminals at a time $t^1$ approximating to $nT/2$ from the cessation of the application of the train, where $n$ is an odd integer, preferably unity.

By "a loss factor of two for each reflection cycle" is meant that the amplitude of each reflected pulse at the said terminals is half that of the immediately preceding pulse. By "pulse interval" is meant the interval between centers of successive pulses. By "delay-line device" is meant an actual delay-line, the said two terminals being at the same end of the line, or an equivalent two-terminal network.

In the accompanying drawings,

Figure 1 is a simplified diagram of one embodiment of the invention,

Figures 2 to 4 show electrical waveforms to illustrate the principle of operation of the invention, Figures 5 and 6 are schematic diagrams of two embodiments of the invention.

Figure 6:
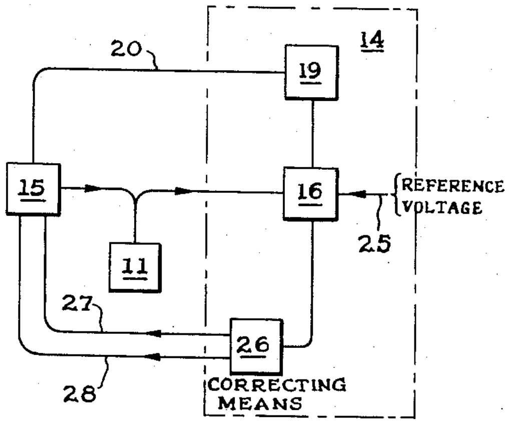

In carrying out the invention in accordance with one form by way of example, a digital-analogue converter includes a two-terminal delay-line represented generally at 11 (see Fig. 1) with the two terminals at 12. The line has a delay equal to half the pulse interval T and a mismatch and/or loss such that there is a loss factor of two over each reflection cycle, as above defined.

Connections 13 are provided for applying to the terminals 12 an input train of binary digital pulses of uniform width and height, with the most significant digit last.

Output means 14, to be described in more detail below, is provided for deriving the voltage across terminals 12 at approximately half the interval T from the cessation of application of the train and for obtaining from that voltage a response signal of some kind proportional to the number represented by the input train.

The effect of applying to the terminals 12 of such a delay-line a rectangular current pulse of width T (i. e., equal to the duration of each reflection cycle) is to set up across the terminals a voltage having the stepped exponential waveform shown in Fig. 2, starting at a time $t_0$ synchronous with the end of the pulse. The width of each step is T and the voltage level of each step except the first is half that of the preceding step.

Suppose now a train of binary current pulses of uniform pulse interval T, each pulse occupying the whole available pulse time and therefore having a width T, is applied over connections 13 to the line 11, the pulse which represents the most significant digit coming last. In response to each pulse the line 11 reacts as if a voltage of the Fig. 2 waveform is originated at the end of the pulse. On the cessation of the application of the train, therefore, the voltage across terminals 12 is the sum of the voltage steps of the respective waveforms as then existing. The height of each step at that moment is dependent on the position of the pulse in the train, being directly proportional to the significance of the digit represented. Where the digit is zero there is of course no pulse and hence no stepped waveform.

For example, suppose the pulse train is of the waveform shown in Fig. 3, representing the binary number 1011, or 11 in the decimal system, each pulse occupying the whole available pulse time. The respective digits are indicated at A, B, C and D, with D the most significant. There is no pulse at C as this digit is zero.

As already indicated, the effect on the line is as if a voltage of the Fig. 2 waveform is originated at the termination of each pulse A, B, and D. At the time $t_0$ synchronous with the end of pulse A the voltage waveform $A^1$ (see Fig. 4) is originated. At a time $t_1$, spaced by the pulse interval T after the time $t_0$, the waveform $B^1$ (shown for clarity displaced above waveform $A^1$ instead of superposed on it) is originated at the end of pulse B. At the time $t_2$, spaced by the interval T from $t_1$, no new waveform is originated since the C digit is zero. At a time $t_3$, spaced by the interval T from $t_2$, however, the waveform $D^1$ (also displaced upwards for clarity) is originated at the end of pulse D.

It will be seen from Fig. 4 that at a time $t^1$ approximately to $T/2$ from the cessation of the application of the train at the time $t_3$ the voltage at the terminals 12 of the delay-line is the sum of the voltage steps $a$, $b$, and $d$ of the respective waveforms. Assuming the height of the step $a$ to be $v$ volts, the voltage at the terminals is clearly $(v+2v+8v)$ or $11v$, in the decimal notation. This voltage is therefore the required signal proportional to the analogue of the binary number represented by the input train.

At a time $t_4$ at the end of an interval T from the time $t_3$ this combined voltage falls to half the previous value $11v$; and at subsequent intervals T it continues to fall in that ratio, the waveform being again that of Fig. 2. Though this voltage remains proportional to the required analogue and so could be derived at any time approximating to $nT/2$ from the cessation of the applied train, where $n$ is an odd integer, it is clearly desirable to derive it whilst it is at its maximum, that is, at the time $t^1$ between times $t_3$ and $t_4$, $n$ here being unity.

An arrangement for deriving this voltage at approximately the time $t^1$ and for obtaining from the voltage so derived an output signal which indicates the required analogue will now be described with reference to the schematic diagram of Fig. 5.

The trains of pulses representing the binary number the analogue of which is required are assumed to be derived from some source 15 which is such as to apply the trains repetitively to the delay-line 11.

The output means 14 here includes a voltage comparator 16 connected for voltage comparison to the terminals of the delay-line on the one hannd and on the other hand to an adjustable slider 17 of a potentiometer 18 energized positively by a direct-current source. The output means also includes strobing means 19 connected to control the comparator by strobe pulses. Each of such pulses renders the comparator active for a very short interval—a fraction of the pulse interval T—at approximately the time $t^1$, the comparator being at all other times inactive. As the time $t^1$ is dependent on the occurrence of a pulse train, the strobing means 19 is intercoupled with the pulse source 15 by a channel 20 to ensure appropriate synchronism. A convenient arrangement is for the strobing means 19 to include a generator of "clock" pulses which are applied over channel 20 to initiate each transmission of a train of digit pulses from source 15 and to cause a strobe pulse to activate comparator 16 at the approximate instant $t^1$ after each such initiation.

Comparator 16 is designed to compare the voltage across the delay-line terminals at the time $t^1$ with the reference voltage from slider 17, and to derive an error signal when these voltages are unequal, the sense of the error signal being dependent on which of the voltages is the greater. This error signal is applied over a channel 21 to control correcting means in the form of a servo motor 22 the shaft of which is mechanically coupled, as indicated symbolically at 23, to slider 17.

The operation of this arrangement need only be indicated briefly since it operates to some extent on known follow-up servo principles.

At approximately the time $t^1$ after each pulse train has been applied to the delay-line, a strobe pulse activates comparator 16 for a fraction of the interval T as already explained. During this brief interval the comparator compares the voltage across the delay-line terminals with the reference voltage from potentiometer 18. Where these two voltages are unequal an error signal is derived and applied, in the interval which elapses till the end of the next train, to motor 22 to adjust slider 17 in the sense appropriate to correcting the reference voltage. This sequence of operations is repeated at the end of each pulse train until equality is attained. The position of the potentiometer shaft is then indicative of the required analogue.

Where it is desired to convert from analogue to binary digital form, the apparatus of Fig. 5 may be modified as shown in Fig. 6, where the components that have already been described are indicated by the references previously used. Here the reference voltage represents the analogue number to be converted. This voltage is applied to comparator 16 over a channel 25 and the error signal is used to adjust the binary significance of the pulse trains. This adjustment may be effected by causing the error signal to activate correcting means in the form of an Add/Subtract stage 26 which is connected by Add and Subtract channels 27 and 28 respectively to the pulse source 15. If as the result of a comparison the voltage derived from the delay-line is less than the analogue voltage derived over channel 25, the error signal actuates stage 26 to cause a digit to be added to the next train to be applied to the delay-line, the process being repeated until the voltage across the terminals of the delay-line at the time $t^1$ has been raised to equality with the analogue voltage. Each pulse train then represents the number concerned in binary form.

Where the delay-line voltage exceeds the reference voltage, the error signal operates stage 26 in the opposite sense to subtract a pulse.

In either of these arrangements each pulse of the binary trains need not occupy the whole available pulse time. Alternatively, successive pulses may be spaced from one another, as long as the pulse widths are uniform and the pulse interval is T. In this case each of the voltage waveforms of Fig. 4 returns to zero between successive voltage steps; otherwise the operation is as described.

It will be appreciated that in the arrangement of Fig. 6, though the overall conversion is from analogue to binary form, the apparatus in accordance with the invention still acts as it does in the arrangements of Fig. 1 and Fig. 5 to convert a binary number (as delivered from source 15 to the delay-line) to analogue form (as derived in the comparator during the strobed interval).

It is not usually convenient to use a real delay-line owing to the length of line and the high impedance required. Instead, an equivalent two-terminal network, such as may be derived by Foster's theorem, may be used.

In designing such a network it is necessary to compromise between the precision of the flat parts of the steps and their duration. A practical approximation may be achieved by empirical adjustment of a network designed for maximum flatness.

Figure 7:
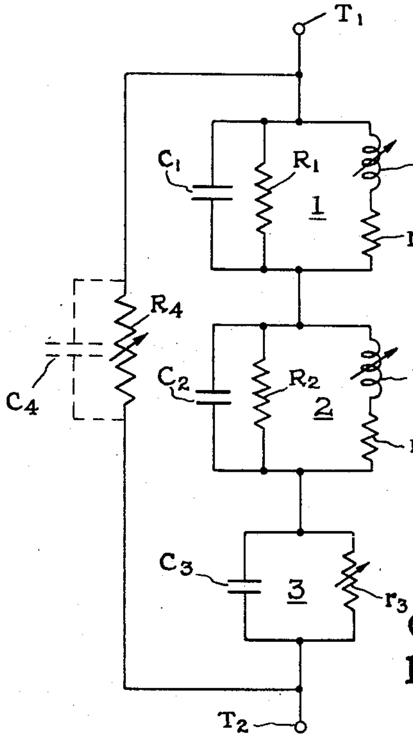
Figure 7 is a diagram of connections of a part of one embodiment of the invention.

Such a network may consist of two oscillatory circuits 1 and 2 (see Fig. 7) connected in series with the parallel combination 3 of a capacitor and resistor between the two terminals $T_1$ and $T_2$.

Oscillatory circuit 1 includes an inductor $L_1$ having a damping resistor $r_1$ in series with it, and a capacitor $C_1$ having a damping resistor $R_1$ in shunt. Oscillatory circuit 2 consists of similar components indicated by the same reference letters but having the suffix 2.

The capacitor and resistor of combination 3 are designated $C_3$ and $r_3$.

Circuit 1 is tuned to a frequency $f_1=2/T$, where T is the width of each applied pulse and hence of each step, as indicated above. Circuit 2 is tuned to a frequency $f_2=1/T$. The capacitances of capacitors $C_1$ and $C_2$ are respectively $3c$ and $3c/4$, where $c$ is the capacitance of capacitor $C_3$. The value of each resistor is such as to yield a time constant $T/\log_e 2$ with its associated reactance.

The unavoidable stray capacitances of the drive and detector stages of the network are represented by a capacitor $C_4$. To render this appropriately dissipative, a resistor $R_4$ such as to yield a time constant $T/\log_e 2$ with capacitor $C_4$ is connected across the whole network.

To allow the network to be adjusted for optimum shape of step, means are provided for tuning the oscillatory circuit 1 and 2. This is most conveniently effected by providing inductors $L_1$ and $L_2$ with tuning slugs.

Adjustment of the damping effected by the resistors in circuit 1 and 2 is also required. It is however necessary to preserve the relationship $CR=L/r$ in each case. This may be effected by including in each oscillatory circuit a potentiometer P (see Fig. 8) in such conjunction with a shunt resistor $R^1$ and series resistor $r^1$ that adjustment of the potentiometer slider in one direction reduces the total resistance in series with inductor L whilst increasing that in shunt with capacitor C, and vice versa. As the variations of the resistance in series with the inductor must be less than the variations of the resistance in shunt with the capacitor, a further resistor $r^{11}$ is connected in shunt with that part of the potentiometer included in series with the inductor.

Figure 8:
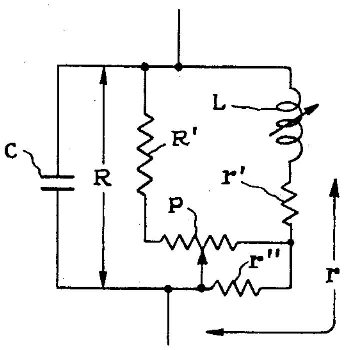
Figure 8 shows a modified form of a part of the embodiment shown in Figure 7.

With this arrangement there is a range of potentiometer adjustments which permit variation of the damping time constants CR and $L/r$ (where R and $r$ have the overall shunt and series values as shown in Fig. 8) whilst keeping the product $Rr$ approximately constant. The fixed resistors $R^1$ and $r^1$ effectively in series with the potentiometer are to confine the range of adjustment to that region where the desired condition is approximately fulfilled.

Resistors $r_3$ and $R_4$ (see Fig. 7) are also made variable.

Means for adjusting the tuning and damping of the network are thus provided. A convenient procedure for doing this is as follows.

A binary counting store is provided and connected to the network so as repetitively to apply to it sequential trains of pulses representing successive numbers of the binary scale, up to the limit required. At the end of each train, the voltage at the terminals of the network should have the level appropriate to the number represented by that train. This voltage is applied to the Y plates of an oscilloscope, to the X plates of which is applied a signal synchronized to the input pulse trains so that the voltage outputs at the ends of the trains are displayed as a column of short approximately horizontal lines. At the end of each sequence of trains a fresh sequence starts, the column of output voltage displays being in register with the preceding column so that the eye sees a steady column of approximately horizontal lines which represent the successive analogue values of the successive input pulse trains.

The lines of the column should appear accurately horizontal, and evenly spaced one above the other. If the lines are not horizontal, they may be corrected by adjusting the tuning of inductors $L_1$ and $L_2$. If the lines are not evenly spaced, they may be corrected by adjusting the potentiometers described with reference to Fig. 8. This correction is greatly facilitated by the fact that half way through each sequence occurs the maximum digital change, the output voltage changing from the sum of a considerable number of "steps" to one step only, e. g. from binary number 0111111 to 1000000, in the case where the converter is designed to handle numbers up to 1111111. If therefore the voltage lines in the mid region of the column are correctly spaced, as shown by neighbouring lines, the converter is accurately adjusted.

What we claim is:

1. A digital-analogue converter for deriving a signal proportional to the number represented by an input train of binary digital current pulses of uniform width and height, the pulse representing the most significant digit coming last, including a two-terminal delay-line device having a delay equal to half the pulse interval T of said pulses and a loss factor of two over each reflection cycle, connections for applying said input train to said terminals, and output means for deriving the voltage across said terminals at a time $t^1$ approximating to $nT/2$ from the cessation of the application of the train, where $n$ is an odd integer, preferably unity.

2. A converter as claimed in claim 1 wherein means are provided for applying said input train to said terminals repetitively and wherein said output means includes a voltage comparator connected to said terminals for comparing the voltage across them with a reference voltage and deriving an error signal when these voltages are unequal, strobing means for repetitively rendering said comparator active only for a fraction of said interval T at approximately said time $t^1$ after the cessation of application of each train, and correcting means for repetitively applying said error signal to render said voltages equal in the course of such repetitive applications of said train.

3. A converter as claimed in claim 2 wherein said correcting means includes a servomotor for actuation by the error signal to adjust the value of said reference voltage.

4. A converter as claimed in claim 2 wherein said correcting means includes a stage for actuation by the error signal to adjust the binary significance of said input train.

5. A converter as claimed in claim 1 wherein said delay-line device is a Foster two-terminal network equivalent to a delay-line.

6. A converter as claimed in claim 5 wherein said network includes two inductor/capacitor oscillatory circuits connected in series with the parallel combination of a third capacitor and a resistor between said terminals, each oscillatory circuit including a damping resistor in shunt with the capacitor and a further damping resistor in series with the inductor and being tuned to frequencies $2/T$ and $1/T$ respectively, the capacitors having respectively three times and three-quarters the capacitance of said third capacitor and the value of each resistor being such as to yield a time constant $T/\log_e 2$ with its associated reactance, said terminals being also connected to one another direct by a resistor such as to yield said time constant with stray capacitances.

7. A converter as claimed in claim 6 wherein each of said oscillatory circuits is arranged to allow adjustment of the damping resistors whilst preserving the relationship $CR=L/r$, where C and L are the capacitance and inductance of the appropriate elements and R and $r$ are the resistances of the damping resistors respectively associated with them.

References Cited in the file of this patent

UNITED STATES PATENTS

| | | |
|---|---|---|
| 2,641,698 | Gloess et al. | June 9, 1953 |
| 2,736,889 | Kaiser et al. | Feb. 28, 1956 |

OTHER REFERENCES

Everitt and Anner., Communication Engineering, McGraw-Hill, 1956, 3rd edition. Pp. 172 to 174 and 537.